United States Patent Office 3,453,182
Patented July 1, 1969

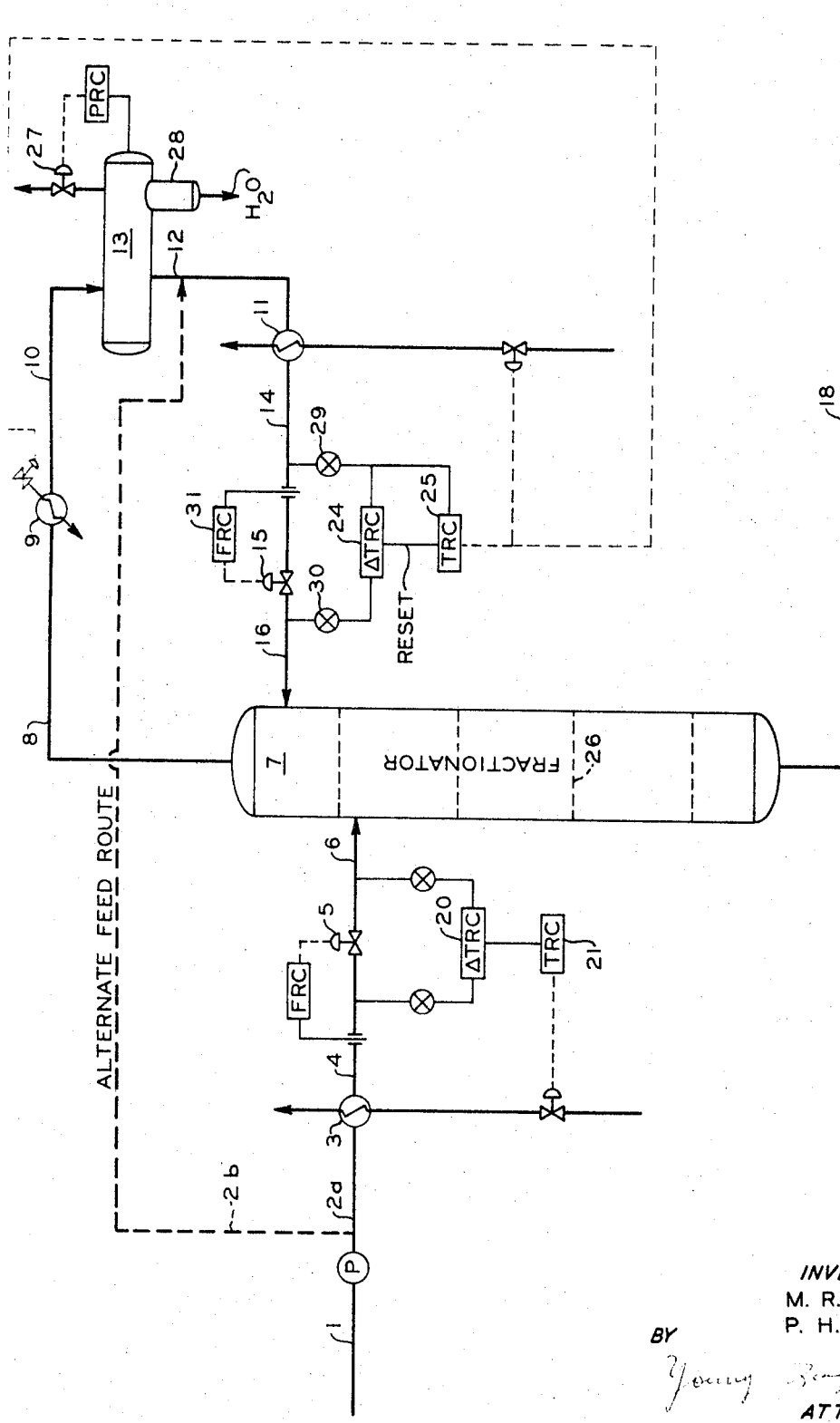

3,453,182
CONTROL OF AMOUNT OF VAPOR IN FEED TO VAPOR-LIQUID SEPARATION ZONE BY DETECTING THE TEMPERATURE DIFFERENTIAL ACROSS A PRESSURE DIFFERENTIAL ZONE
Martin R. Reber and Paul H. Wagner, Bartlesville, Okla., assignors to Phillips Petroleum Company, a corporation of Delaware
Filed Sept. 16, 1966, Ser. No. 580,101
Int. Cl. C07c 51/44; B01d 3/42, 3/06
U.S. Cl. 203—2
17 Claims

ABSTRACT OF THE DISCLOSURE

A stream from which a vapor can be separated, as by distillation, is passed through a pressure reducing zone. The differential in the temperature of the stream before and after pressure reduction is used to control the temperature at which the stream is treated for vaporization therefrom. A disclosed stream is cyclohexane solvent containing low molecular weight polyolefin and water was obtained in a process for producing polyolefin in the presence of a catalyst. In one form the feed to a distillation column is passed through a preheater and adjusted to a preset temperature which is compared with the feed temperature after passing through a pressure throttling device, yielding a measure of degree of vaporization or flashing which has occurred; assentially, adiabatically resulting in a lower tempearture. The differential temperature is used to control the temperature to which the feed is preheated. It is possible to remove substantially all of the water from the solvent without losing overhead a substantial amount of solid. Also disclosed is an analogous temperature control on reflux when a distillation column which is refluxed is used.

This invention relates to the control of the amount of vapor present in a feed stream passed to a vapor-liquid separation zone. In one of its aspects, it relates to the control of the amount of vapor being formed in a stream being fed into a distillation or fractionation zone. In another of its aspects, it relates to an apparatus combination for automaticlly controlling the temperature of a stream fed to such a zone so as to control the proportion of vapor formed in said stream being fed to said zone.

In one of its concepts, the invention provides a method for passing a stream of liquid which has at least a vaporizable portion through a pressure reduction zone or valve to insure that a desired, predetermined proportion of vapor will be present in the stream and controlling the temperature of the stream passing into said zone or valve responsive to the temperature drop detected across said zone or valve. In another of its concepts, the invention provides apparatus comprising means for feeding to a distillation or fractionation tower a stream of a liquid having at least a vaporizable portion, means for reducing the pressure upon said liquid, means for detecting the differential in temperature of the stream as it passes through said means for reducing the pressure thereon and controlling the temperature of the stream fed to said means for reducing the pressure responsive to the detected differential in temperature.

It is known that the temperature of a stream containing a vaporizable portion passing through a zone in which the pressure thereon is reduced will yield some of its liquid as a vapor with a concomitant temperature reduction. It is also known in liquid phase separation control to detect differential in temperature across a pressure reduction zone of valve and to use the temperature difference which may develop across such a valve when the composition of the stream flowing through said valve changes to close said valve. More specifically, there is described in U.S. Patent 2,872,936, issued Feb. 10, 1959 to J. D. Richardson, a liquid phase separation control in which, for example, water and hydrocarbons are separated, the water phase draw-off from beneath a hydrocarbon phase being controlled by a valve which in turn is controlled as just described and more fully described in said patent.

We have now conceived an operation and apparatus making it possible to conveniently and to accurately control the vaporization of at least a portion of a stream by employing a signal obtained responsive to temperature differential across a pressure reduction zone in which vaporization is ocurring to control the temperature of the stream passing into said zone.

We have further conceived that the separation of free and dissolved water from a solvent or diluent, for example, a diluent employed in the production of polyolefins, can be conveniently and accurately controlled by effecting the usual partial vaporization of a stream of solvent containing water by heating the same and reducing the pressure on the same, the heating being effected responsive to the difference in temperature detected across the zone of pressure reduction. Thus, a number of polyolefin process designs include a solvent or diluent fractionation column in which lower molecular weight components and water are removed from feed or recycle streams in the process. When the removal of free and dissolved water in these streams is effected by fractionation, it is important to partially vaporize the feed stream and the reflux to the fractionator to assure that a free liquid water phase will not be present. The control of the method and of the apparatus of the present invention is predominantly suited to control the degree desired of feed stream vaporization and thus the enthalpy of the column feed.

It is an object of this invention to provide a method for the separation of a vapor from a liquid from which it is vaporized. It is another object of this invention to provide an apparatus for separating under controlled conditions a vaporizable portion from a liquid containing the same. It is a further object of the invention to provide an automatic control for the vaporization of at least a portion of a liquid so that the said vapor and liquid can be separated. It is a further object of the invention to provide a method and means for separating from a solvent or a diluent water that is dissolved or suspended therein in controlled manner so that substantially no free liquid water phase will be present in the solvent.

Other concepts, objects and the several advantages of the invention are apparent from a study of this disclosure, the drawing and the appended claims.

According to the invention, there is provided a method for vaporizing or flashing from a stream fed to a vapor-liquid separation zone through a pressure release valve or pressure reduction zone a portion of said stream by heating said stream responsive to the differential in temperature detected across said zone.

Thus, according to the invention there is provided a method for adjusting and, indeed, maintaining a temperature of a feed stream to a vapor-liquid separation zone at such a level at all times that is possible to separate a predetermined portion of vapor at all times and to do this regardless of variations in composition of said liquid.

Further, according to the invention the apparatus comprises essentially means for passing a liquid stream to a vapor-liquid separation device, means in the first mentioned means for reducing the pressure on said liquid, means to detect the temperature of the liquid just prior to and just subsequent to said means for reducing the pressure, and means for adjusting the temperature of the liquid being fed to said means for reducing the pressure responsive to the detected pressure differential.

In the now preferred form of the invention, the liquid or column feed stream is preheated at a pressure preventing substantial vaporization and then passing the liquid through a pressure throttling device control valve to essentially the pressure of the column in which the vapor and liquid are to be separated. Thus, the feed is passed through a feed preheater in which its temperature is adjusted to a preset temperature. This preset temperature is then compared with that of the stream after it has passed through the pressure throttling device. In this manner, the degree of vaporization or flashing which has occurred is measured. This flashing is essentially adiabatic and, accordingly, results in a lower temperature on the column side of the throttling device or valve. It is within the scope of the invention to manually reset the feed preheat to temperature based on the detected differential temperature, although it is now preferred to perform this operation automatically by use of a temperature recorder controller and a differential temperature recorder controller.

It is also within the contemplation of the present invention to adjust the temperature of any stream being passed to a vapor-liquid separation column or zone. Thus, we now contemplate the adjusting of the temperature of a reflux stream to a column. Such a column can be one in which the present invention is already operating on the main feed to the column. Further, it is within the scope of the present invention to adjust the temperature of the reflux stream by adjusting the amount of cooling water or other heat exchange medium with which the reflux creating stream, e.g., the overhead from the column, is contacted. As is known, overhead condensers and coolers are inter-positioned on vapor take-off lines for indirect heat exchange of the heat in the vapor with a cooling medium such as water. Thus, the present invention contemplates at least a trim cooler with which the temperature of the reflux liquid is adjusted. The adjusting of the temperature of this reflux liquid is carried out responsive to temperature differential across an expansion zone or valve through which it is fed to an appropriate portion of the column.

One skilled in the art in possession of this disclosure, having studied the same, will recognize at once that the control just described for the reflux to a column can be effected regardless of whether there is a control, as already described, on the feed to the column. However, as presently preferred for best operation, there will be at least a control on the feed, as described, and there may be a further control on the reflux or other stream returned to the column.

As noted, the invention is particularly applicable for the removal of free and dissolved water from a solvent which ordinarily in the case contemplated for the production of polyolefins will be a hydrocarbon material. By use of the present invention, it is possible to remove substantially all of the water that is desired to be removed without, however, losing overhead a substantial amount of solvent.

Referring now to the drawing in which there is described the removal of water from hydrocarbon diluent, e.g., cyclohexane, which has been used in the production of polyolefin, e.g., polyethylene, as described in U.S. Patent 2,825,721, issued Mar. 4, 1958 to John Paul Hogan and Robert L. Banks, there is passed by pump 1, pipe 2a, preheater 3, pipe 4, pressure reducing valve 5 and pipe 6 into the upper portion of fractionator 7 containing vapor-liquid contacting trays 26 a stream of cyclohexane diluent containing water, light gases such as nitrogen, hydrogen, methane, etc., and some low molecular weight polymer. From the top of fractionator 7 are removed via pipe 8 water vapor, light gases, and cyclohexane vapor. The vapor stream is passed through cooler 9 for liquefaction of the water and cyclohexane vapors. The light gases are not liquefied. The resulting mixture of liquid and gas is discharged into accumulator 13 from which the light gases are discharged through pressure relief valve 27. Water settles in settling leg 28 from which it is periodically or continuously removed from the system. Cyclohexane passes from the accumulator via pipe 12 to heat exchanger 11, pipe 14, pressure reduction valve 15 and pipe 16 into the top of fractionator 7 to serve as reflux. In response to temperature measurements of the reflux stream before and after pressure reduction, 29 and 30, differential temperature controller 24 adjusts the set-point of temperature controller 25 which in turn manipulates the flow of heat exchange fluid passing to heat exchange zone 11. Controller 24 thus adjusts the heating of stream 14 until the desired differential temperature across valve 15 is obtained—this assures vaporization of a desired portion of stream 14, thus converting all free water and at least part of the dissolved water in stream 14 to the vapor state. Upon entering fractionator 7, the water vapor passes overhead via pipe 8 and is thus removed via settler 28 from the system. Pressure reduction valve 15 is manipulated by conventional flow controller 31.

In a similar manner, differential temperature controller 20 adjusts the heat input to feed stream 2a until a desired temperature differential across pressure reduction valve 5 is obtained, thus assuring vaporization of all free water and at least part of the dissolved water in the feed stream.

It is sometimes possible and even desirable to combine the feed stream with the reflux stream. This is accomplished by passing the feed through pipe 2b into pipe 12.

Cyclohexane free of water but containing heavier components such as low molecular weight polymer is removed from the bottom of the fractionator via pipe 18. In some cases a high-purity cyclohexane product is removed from a midpoint (below feed entry) of the fractionator and heavy impurities from the bottom. This eliminates passing stream 18 to a second fractionator for separation of the heavy impurities from the cyclohexane.

The following tabulation shows the various temperatures, pressures, flow rates, and mol ratios of components in the operation just described with and without pressure and temperature reduction across valve 15.

| | Without temperature differential across valve 15 | With 10° F. temperature differential across valve 15 |
|---|---|---|
| Flow rate, mol/hr,: | | |
| Feed, stream 26 | 100 | 100 |
| Reflux, stream 12 | 10 | 10 |
| Feed combined with reflux, stream 14 | 110 | 110 |
| Bottoms, stream 18 | 100 | 100 |
| Water content, mol percent: | | |
| Feed, stream 26 | [1] 1.00 | [1] 1.00 |
| Reflux, stream 12 | [1] 0.20 | [1] 0.20 |
| Feed combined with reflux, stream 14 | [1] 0.93 | [1] 0.93 |
| Bottoms, stream 18 | 0.1 | 0 |
| Temperatures, °F,: | | |
| Feed, stream 26 | 100 | 100 |
| Reflux, stream 12 | 105 | 105 |
| Feed combined with reflux: | | |
| Stream 14 | 170 | 185 |
| Stream 16 | 170 | 175 |
| Fractionator: | | |
| Top | 170 | 175 |
| Bottom | 198 | 198 |
| Accumulator 13 | 105 | 105 |
| Pressures, p.s.i.a.: | | |
| Fractionator bottom | 20 | 20 |
| Accumulator 13 | 18 | 18 |

[1] Contain free water phase.

The preceding data illustrate the improvement obtained by heating the combined feed and reflux to the fractionator in order to obtain a 10° F. temperature drop across pressure reduction valve—the water content of the cyclohexane bottoms product dropped from 0.1 mol percent to 0. This water-free cyclohexane, after removal of heavy impurities, may be recycled to the polymerization reactor without loss of catalyst productivity because of water.

The process for producing polyolefins in the patent above-mentioned is set forth as one which can employ various solvents or diulents. These are included by reference herein. The process of the patent is set forth as one employing a certain catalyst and conditions which are also incorporated by reference herein. Indeed, this invention being applicable particularly to the processing of a stream obtained from such a process as described in the said patent, the process of the said patent is in its entirety incorporated herein by reference.

Our invention may also be used for removing water from solvents used in polymerizing diolefins. For example, benzene or toluene, used as solvent for polymerizing butadiene as described in U.S. Patent 3,178,402, may be advantageously purified of water as a catalyst poison by our invention, thus increasing catalyst productivity to high levels.

Reasonable variation and modification are possible within the scope of the foregoing disclosure, the drawing and the appended claims to the invention, the essence of which is that there have been provided a method and means for controlling the temperature and, therefore, the amount of a vaporizable portion separated from a liquid containing the same, the method and means being each of them based upon the concept that the temperature reduction experienced upon expanding such a stream through a pressure reducing zone results in a detectable temperature difference which is then used to control or to adjust the temperature of said stream substantially as set forth and described.

We claim:

1. A method for vaporization of a portion of a liquid stream and separation of vapors formed from remaining liquid which comprises in a temperature adjusting zone adjusting the temperature of said stream to a temperature at which desirable vaporization of said stream will occur upon a subsequent reduction of pressure on said stream, then passing said stream through a pressure reducing zone causing vaporization and thence to a vapor from liquid separation zone in which vapor is being separated from liquid and in said last zone separating the vapors thus formed from remaining liquid, detecting the differential between the temperature of said stream prior to and after it has passed through said pressure reducing zone and adjusting the temperature of said stream in said temperature adjusting zone responsive to said differential.

2. A method according to claim 1 wherein the stream is a feed stream to a distillation zone and wherein the portion of the stream to be vaporized is at least partially dissolved in and of a character different from the portion not desired to be vaporized, and the operation is conducted to effect vaporization of substantially all of the portion of the stream desired to be vaporized.

3. A method according to claim 1 wherein the temperature of the reflux stream is adjusted by controlling the coolant affecting the overhead from the distillation zone responsive to said differential.

4. A method according to claim 1 wherein the stream contains a hydrocarbon and water and the water is vaporized in passing through said pressure reducing zone.

5. A method according to claim 1 wherein the stream is one containing a hydrocarbon diluent such as cyclohexane, low molecular weight material and water as obtained in a process for producing a polyolefin in the presence of a catalyst.

6. A method according to claim 1 wherein the heat content and therefore, the temperature, of the stream is adjusted automotically responsive to said differential.

7. An apparatus for the vaporization of a portion of a liquid stream which comprises a vapor from liquid separation means, means for feeding to said vapor from liquid separation means a stream of liquid having a vaporizable portion, means upon said means for feeding said liquid to adjust the temperature of said liquid, means upon said means for feeding the liquid to reduce the pressure thereon, causing the vaporization of a portion thereof, means for detecting the temperature of said liquid just prior to and after the pressure thereon has been reduced, and means for controlling said means for adjusting the temperature of said liquid responsive to the difference of the detected temperatures.

8. An apparatus according to claim 7 wherein the means for feeding said stream is a means for feeding the principal feed to a vapor from liquid separation means.

9. An apparatus according to claim 7 wherein the means for feeding said liquid is a means for feeding reflux to a vapor from liquid separation means.

10. A method for adjusting a stream of reflux to a vapor from liquid separation zone in which vapor is separated from liquid which comprises passing said reflux stream through a pressure reducing zone, in said zone reducing the pressure on said reflux sufficiently to detect a change of its temperature, detecting the differential between the temperature of said stream prior to and after it has passed through said pressure reducing zone, in a temperature adjusting zone adjusting the temperature of said stream responsive to said differential to a temperature desirable for effecting said separation and then passing said reflux to a vapor from liquid separation zone and in said separation zone effecting the separation of vapor from liquid.

11. A method of separating in a distillation zone a vapor from a stream containing a liquid and said vapor in admixture which comprises passing said admixture through a pressure reducing zone, in said zone reducing the pressure on said admixture sufficiently to detect a change of its temperature, detecting the differential between the temperature of said stream prior to and after it has passed through said pressure reducing zone, in a temperature adjusting zone adjusting the temperature of said admixture responsive to said differential to a temperature desirable for effecting said separation and then passing said admixture to said distillation zone and in said distillation zone effecting the separation of vapor from said admixture.

12. A method according to claim 11 wherein the temperature of the stream is adjusted prior to passing it through the pressure reducing zone so as to cause a substantial detectable temperature change due to vaporization occurring in said pressure reducing zone.

13. A method for the separation of a vapor from a stream containing a liquid and said vapor in admixture which comprises passing said admixture through a pressure reducing zone, in said zone reducing the pressure on said admixture sufficiently to detect a change of its temperature, detecting the differential between the temperature of said stream prior to and after it has passed through said pressure reducing zone, adjusting the temperature of said admixture responsive to said differential to a temperature desirable for effecting said separation and then passing said admixture to said distillation zone and in said distillation zone effecting the separation of vapor from said admixture.

14. A method according to claim 10 wherein the temperature of the reflux stream is adjusted by controlling the amount of cooling water with which the overhead from the column is contacted.

15. A method according to claim 10 wherein the temperature of the reflux stream is adjusted by passing condensed overhead through a heat exchange zone and controlling the amount of heat exchange medium passing through heat exchange zone.

16. A method according to claim 1 wherein said pressure reducing zone is controlled responsive to the rate of flow of said liquid stream thereinto.

17. A method according to claim 13 wherein said pressure reducing zone is controlled responsive to the rate of flow of said admixture thereinto.

References Cited

UNITED STATES PATENTS

| | | | |
|---|---|---|---|
| 2,767,133 | 10/1956 | Shobe | 203—1 |
| 2,872,936 | 2/1959 | Richardson | 62—37 X |
| 2,900,312 | 8/1959 | Gilmore | 203—2 X |
| 2,933,900 | 4/1960 | Hanthorn | 62—21 |
| 2,984,988 | 5/1961 | Berger | 62—37 X |
| 3,084,149 | 4/1963 | Stevens et al. | |
| 3,139,391 | 6/1964 | Walker | 202—160 X |
| 3,212,997 | 10/1965 | Walker | 62—21 X |

WILBUR L. BASCOMB, JR., *Primary Examiner.*

U.S. Cl. X.R.

196—132, 141; 202—160, 206; 203—14, 88, 99; 260—94.9